(12) United States Patent
Kim

(10) Patent No.: US 10,787,211 B2
(45) Date of Patent: Sep. 29, 2020

(54) CRAWLER PAD WITH IMPROVED DURABILITY

(71) Applicant: TR Beltrack Co., Ltd., Daejeon (KR)

(72) Inventor: Woojeong Kim, Daejeon (KR)

(73) Assignee: TR BELTRACK CO., LTD., Daejeon (KR)

( * ) Notice: Subject to any disclaimer, the term of this patent is extended or adjusted under 35 U.S.C. 154(b) by 293 days.

(21) Appl. No.: 15/945,104

(22) Filed: Apr. 4, 2018

(65) Prior Publication Data

US 2019/0039665 A1 Feb. 7, 2019

(30) Foreign Application Priority Data

Aug. 7, 2017 (KR) .......................... 10-2017-0099634

(51) Int. Cl.
*B62D 55/28* (2006.01)
*B62D 55/26* (2006.01)

(52) U.S. Cl.
CPC ............. *B62D 55/28* (2013.01); *B62D 55/26* (2013.01)

(58) Field of Classification Search
CPC ....... B62D 55/26; B62D 55/28; B62D 55/286
See application file for complete search history.

(56) References Cited

U.S. PATENT DOCUMENTS

| | | | | |
|---|---|---|---|---|
| 4,094,557 A * | 6/1978 | Miller | ................... | B62D 55/286 305/111 |
| 4,588,233 A * | 5/1986 | DenBesten | .......... | B62D 55/275 305/51 |
| 5,630,657 A * | 5/1997 | Kumano | ................ | B62D 55/26 305/189 |
| 5,800,026 A * | 9/1998 | Nagata | ................. | B62D 55/275 305/46 |
| 8,011,739 B2 * | 9/2011 | Busley | ................... | B62D 55/28 305/46 |
| 2003/0102715 A1 * | 6/2003 | Watanabe | ............ | B62D 55/244 305/177 |
| 2017/0113744 A1 * | 4/2017 | Kobori | ................... | B21D 28/32 |

FOREIGN PATENT DOCUMENTS

| JP | 07-144667 A | 6/1995 |
|---|---|---|
| JP | 2004-066997 A | 3/2004 |
| JP | 2016-000574 A | 1/2016 |

* cited by examiner

*Primary Examiner* — Jason R Bellinger
(74) *Attorney, Agent, or Firm* — Rabin & Bredo, P.C.

(57) ABSTRACT

Provided is a crawler pad with improved durability for preventing foreign materials from coming through between crawler pads, greatly improving the strength of steel cores and improving the integrity of a pad body and a steel core. In the prior one, the typical crawler pad had a problem that its life time keeps shortened because foreign materials such as sands, etc. penetrate through into the space between neighboring crawler pads, and the rubber-made pad body was damaged. Foreign material prevention stops are formed on with protruded from the front and back surfaces of the ground contact part, and function to firstly prevent foreign material from coming into space between two neighboring pad bodies, and overlap inclines are formed on the front and the back lower surfaces of the pad body respectively with inclined downwards so as to be overlapped with those of neighboring another pad body and thereby to form an overlap region and secondly prevent foreign material from coming into.

1 Claim, 8 Drawing Sheets

CRAWLER PAD WITH IMPROVED DURABILITY

CROSS-REFERENCE TO RELATED APPLICATION

This application claims related under 35 U.S.C. § 119 to Korean Patent Application No. 10-2017-0099634 filed on Aug. 7, 2017, the disclosure of which is hereby incorporated by reference in its entirety.

BACKGROUND

1. Field

Embodiments of the present invention relate to a crawler pad with improved durability, and more particularly, to a crawler pad with improved durability for greatly improving the strength of its steel core and preventing foreign material from coming into the spaces between components, and improving integrity of its pad body and its steel core.

2. Description of Related Art

A rubber crawler is generally used in heavy machinery such as transport vehicles or agriculture machinery such as tractor, combine and so on, and is used for the purposes of facilitating easy movement of vehicles by covering a track roller of a vehicle and being connected to a sprocket or an idler to form caterpillar track.

A typical rubber crawler includes a lug formed as protrusion in order to increase friction with ground, a steel code as antitension body in order to maintain antitension force by enduring weight of vehicle or weight of engine when a vehicle having heavy machinery or agriculture machinery having a rubber crawler installed is being driven, and a steel core for maintaining the shape of the rubber crawler and transferring the driving force of the engine. These are all surrounded by rubber, and are integrally fixed by vulcanization of the rubber, thereby to form the rubber crawler with flexible and endless track shape.

The rubber crawler is made by the processes of inserting a plane-shaped steel code and a steel core into rubber and firstly vulcanizing inside a metal mold so as to produce a plane-shaped first vulcanization, and secondly vulcanizing inside a joint metal mold with the code ends of the first vulcanization faced with each other, so as to produce a final product.

However, the typical built-in type rubber crawler requires expensive special manufacturing production equipment due to complicated manufacturing technology and thus, they are produced only in specialized manufacturers. Therefore, it is expensive in price and cannot reach the expectation of various sizes and shapes because it costs high in the design and development.

While considering these problems, a crawler pad was recently introduced, in which a steel core is installed inside track links connected with endless type by using bolts, and a pad body made of rubber and having the steel core therein is installed. Japanese Patent Publication No. 2016-574 entitled as Crawler Pad discloses such a type of crawler pad as representative related art of technology about this.

The crawler pad of the related art includes a steel core which is installed by using screw member on the crawler peripheral side of track links connected with endless type and has installation holes through which screws of the screw member penetrate the bottom of the intrusion formed on the crawler peripheral side, and a pad body formed of elastic material and installed on the crawler peripheral side of the steel core to form a ground contact part and having insertion holes on the corresponding location to the installation holes for the screw members to be inserted.

However, the crawler pad of the related art has a problem that its life time is shortened because sands or foreign materials come through into the space between neighboring crawler pads and thus rubber-made pad bodies are easily damaged.

Further, when turning toward one side during operation, its turning capability is decreased because the ground contact part is wide in area, and when the equipment is inclined toward one side while turning, ride comfort and stability are deteriorated because cushion becomes weak.

Further, even though the installation holes are most weak in strength when the track link and the crawler pad are coupled, there is no specific alternative to comply with this weak strength, the strength of the steel core becomes low and the adhesive force of the steel core and the pad body becomes low, so that the risk of the separation of the pad body is increased.

SUMMARY

Embodiments of the present invention provide a crawler pad with improved durability, thereby to greatly improve the strength of its steel core and prevent foreign materials from coming into the spaces between components, and improve the integrity of its pad body and its steel core.

In accordance with an aspect of the present invention, stop bumps may be formed on with protruded from the front and back surfaces of the pad body, and function to firstly prevent foreign materials from coming into space between two neighboring pad bodies, and overlap inclines formed under the stop bumps respectively with inclined downwards may be placed to overlap with those of neighboring another pad body, thereby to secondly prevent foreign materials from coming into.

Further, a non-ground contact surface inclinedly formed on the back surface of the ground contact part may function to reduce the rotation frictional resistance with the ground when the apparatus turns toward one side.

Further, the reinforcing bumps which are longitudinally formed at the front, middle and back positions respectively on the upper surface of the steel core, with upwardly protruded from the surface, may improve the strength of the steel core, and increase the adhesive ability with the pad body.

Further, a warp prevention part may be formed on each of the reinforcing bumps with protruded there from, and may additionally contribute to improve the strength of the steel core, and increase the adhesive ability with the pad body.

Therefore, according to the present invention, foreign materials (gravel, sand, etc.) are prevented from entering the spaces between two neighboring pad bodies, thereby to first and secondly, by double ways, prevent rubber-made pad body from being torn apart or burst out, and significantly extend the life time of the crawler pad.

Further, according to the present invention, when the apparatus makes turning toward one side, the non-ground contact surface formed on the back surface of the ground contact part reduces the contact space with the ground, thereby to decrease the rotation frictional resistance and greatly increase the rotation ability.

Further, according to the present invention, since the reinforcing bumps are formed at the front, middle and back positions respectively on the upper surface of the steel core, with upwardly protruded from the surface, the strength of the steel core is increased, and since the reinforcing bumps attribute to increase the contact space with the pad body made of rubber, the bonding ability is increased, and since flowed rubber during the vulcanization process can be induced to efficiently and well flow through both ways between the reinforcing bump, their adhesive capability can be further improved, thereby to make the integrity of the pad body and the steel core higher and manufacture high-quality crawler pads.

Further, according to the present invention, the warp prevention part formed on each of the reinforcing bumps with protruded there from helps to prevent the reinforcing bumps from being bent, thereby to further improve the strength of the steel core, and also improve the durability of the steel core. Thus, the bonding ability of the steel core with the pad body is increased, and the separation of the pad body apart there from can be efficiently prevented.

Further, according to the present invention, rubber thickness enlargements may be respectively formed on both sides of each of the reinforcing bumps, with inclined downwards, and therefore, the portions of the pad body, which contact with the rubber thickness enlargements, are increased, thereby to improve the cushion ability, and further improve the ride comfort and maintain the stability even when the apparatus turns toward one side during rotation operation.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The foregoing and other features and advantages of the present inventions will be apparent from the more particular description of preferred embodiments of the present inventions, as illustrated in the accompanying drawings in which like reference characters refer to the same parts throughout the different views. The drawings are not necessarily to scale, emphasis instead being placed upon illustrating the principles of the present inventions. In the drawings.

DETAILED DESCRIPTION OF THE EMBODIMENTS

Figure 1:
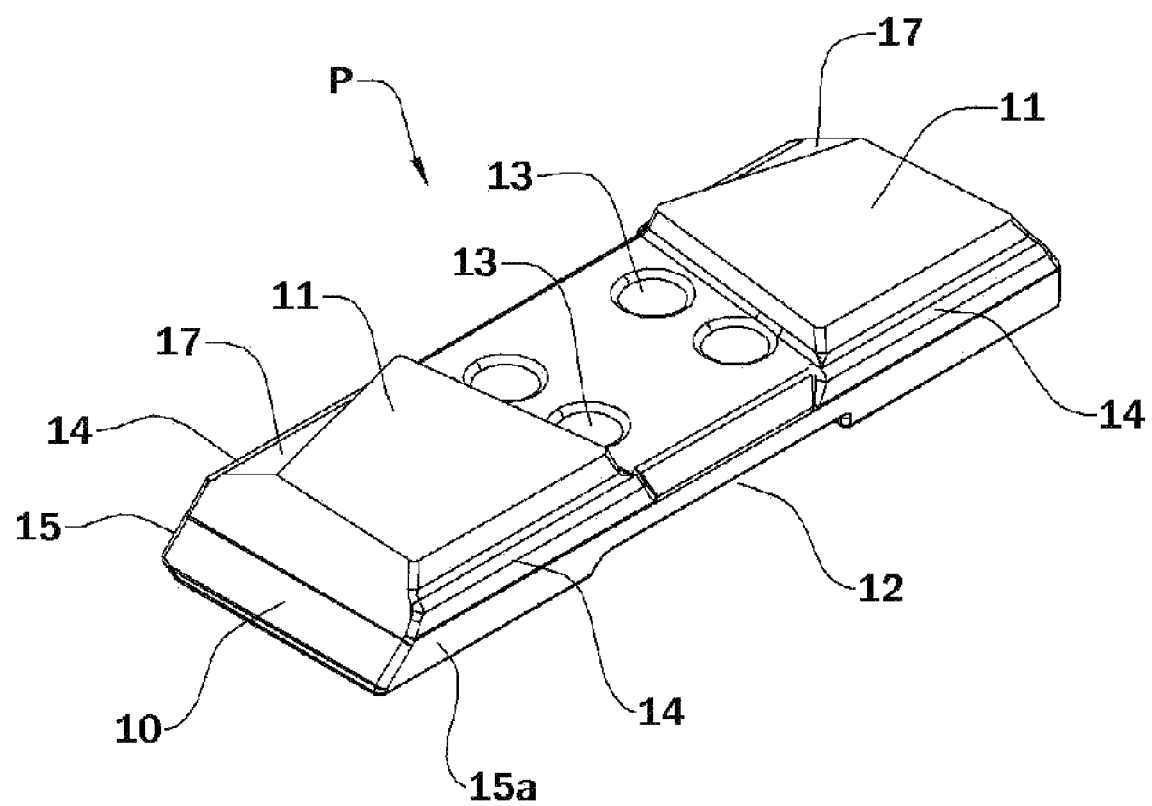
FIG. 1 is a perspective view showing a crawler pad according to one embodiment of the present invention.
Figure 2:
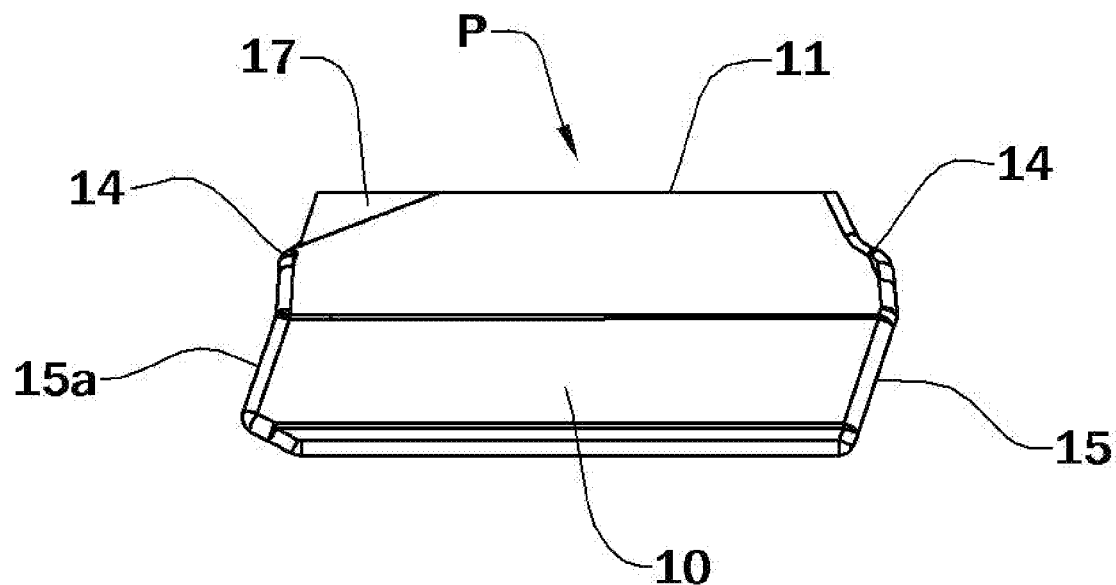
FIG. 2 is a side view of a crawler pad according to one embodiment of the present invention.
Figure 3:
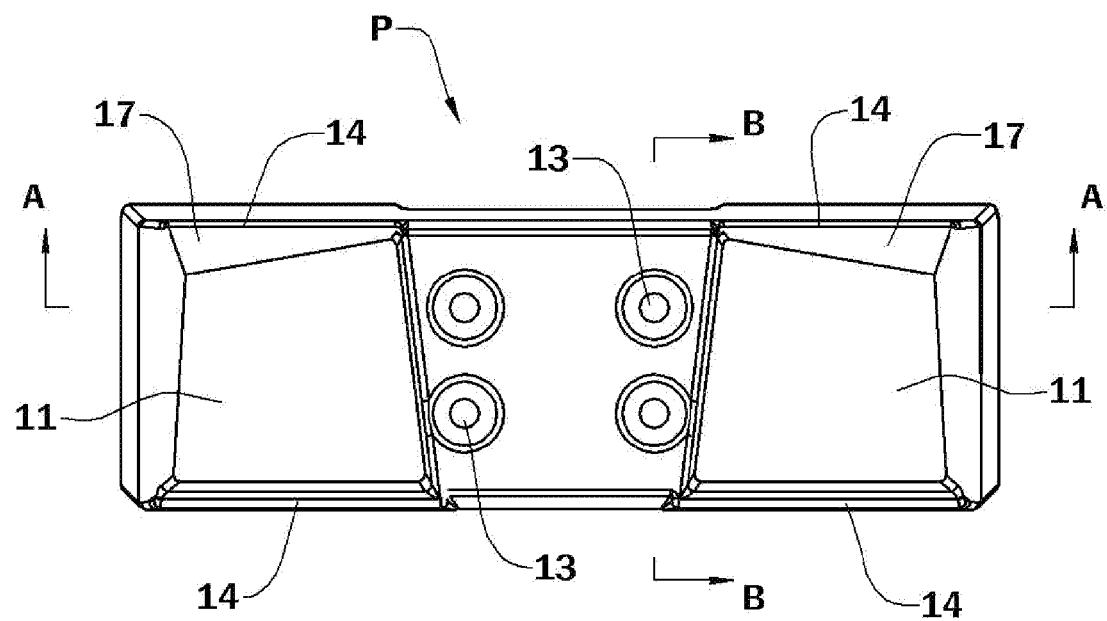
FIG. 3 is a plan view of a crawler pad according to one embodiment of the present invention.
Figure 4:
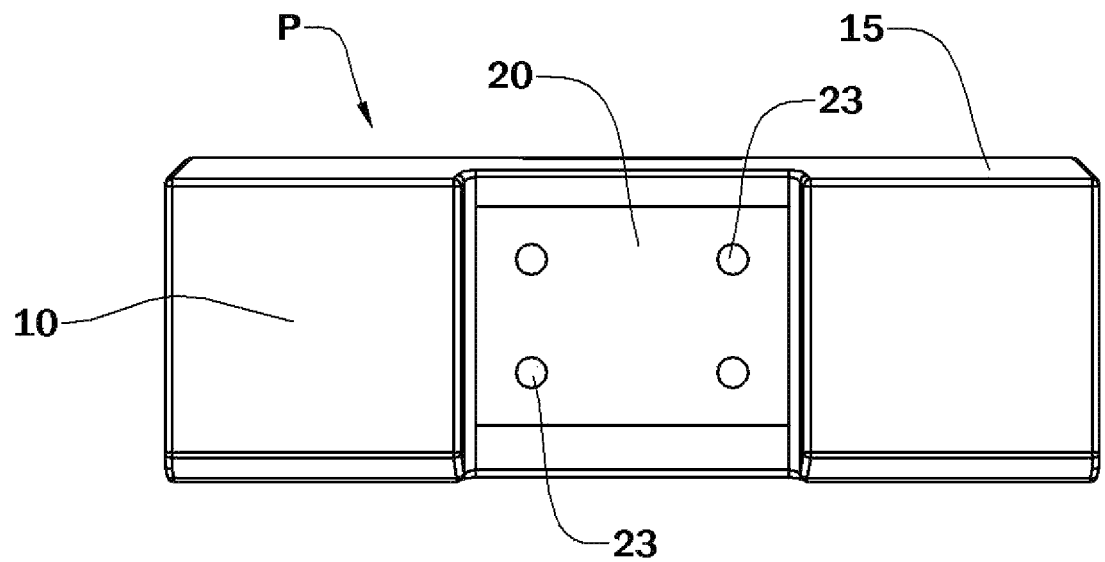
FIG. 4 is a bottom view of a crawler pad according to one embodiment of the present invention.
Figure 5:
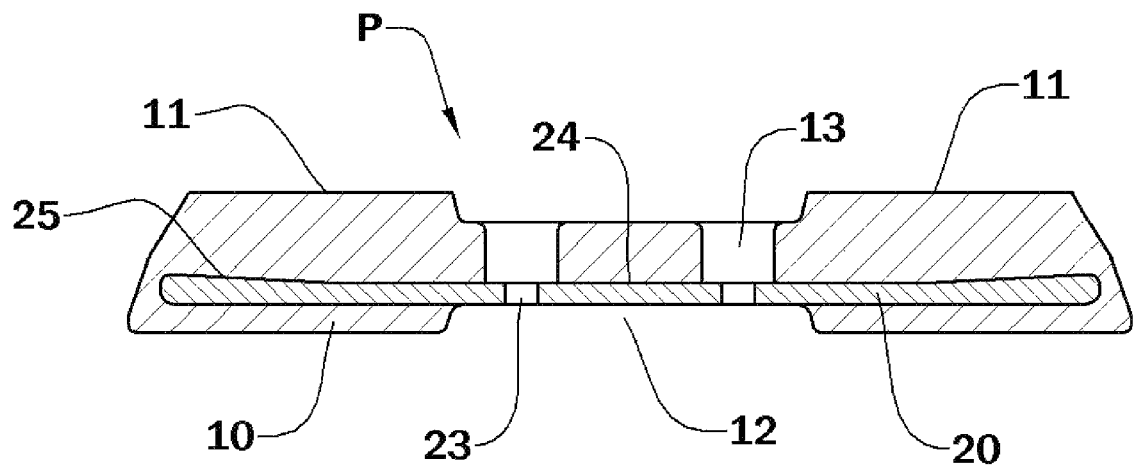
FIG. 5 is a sectional view of FIG. 3 cut by A-A according to one embodiment of the present invention.
Figure 6:
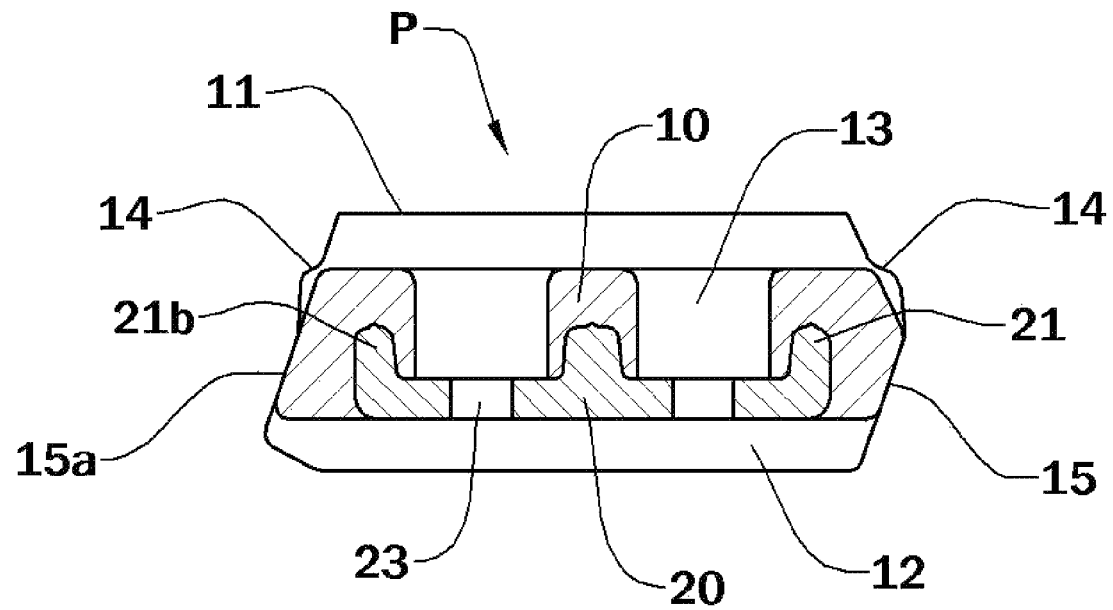
FIG. 6 is a sectional view of FIG. 3 cut by B-B according to one embodiment of the present invention.

Since exemplary embodiments of the present invention are provided only for structural and functional descriptions of the present invention, the present invention should not be construed as limited to the embodiments set forth herein. Thus, it will be clearly understood by those skilled in the art that the exemplary embodiments of the present invention may be embodied in different forms and include equivalents that can realize the spirit of the present invention. It should be understood, however, that it is not intended to limit the present invention to the particular forms disclosed, but on the contrary, the present invention is to cover all modifications, equivalents, and alternatives falling within the spirit and scope of the present invention as defined by the appended claims.

It will be understood that, although the terms first, second, etc. may be used herein to describe various elements, components and/or sections, these elements, components, and/or sections should not be limited by these terms. These terms are only used to distinguish one element, component or section from another ones. Thus, a first element, component or part discussed below could be termed a second element, component or part without departing from the teachings of the present invention.

It will be understood that when an element or part is referred to as being "connected to" or "coupled to" another element or part, it can be directly connected or coupled to the other element or part or intervening elements or parts may be present. In contrast, when an element is referred to as being "directly connected to" or "directly coupled to" another element or part, there are no intervening elements or parts present. Meanwhile, spatially relative terms, such as "between" and "directly between" or "adjacent to" and "directly adjacent to" and the like, which are used herein for ease of description to describe one element or feature's relationship to another element(s) or feature(s) as illustrated in the figures, should be interpreted similarly.

The terminology used herein is for the purpose of describing particular embodiments only and is not intended to be limiting of the present invention. As used herein, the singular forms "a", "an" and "the" are intended to include the plural forms as well, unless the context clearly indicates otherwise. Terms indicating directions of apparatuses or elements (such as "front", "back", "up", "down", "top", "bottom", "left", "right", and "lateral") are used to simplify description of the invention and do not represent nor mean that the apparatuses or elements have specific directions. It will be further understood that the terms "comprises" and/or "comprising," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Unless expressly defined in a specific order herein, respective steps described in the present invention may be performed otherwise. That is, the respective steps may be performed in a specified order, substantially at the same time, or in reverse order.

The present invention will now be described more fully hereinafter with reference to the accompanying drawings, in which exemplary embodiments of the present invention are shown.

In schematic view of a crawler pad of the present invention with reference to attached drawings, the crawler pad roughly comprises a pad body 10, a steel core 20, and a stop bump 14 for preventing foreign materials from entering.

Now hereinafter, the crawler pad, which is comprised as above according to one embodiment of the present invention, will be described in more detail.

The pad body 10 of the present invention is made by inserting the steel core 20 into rubber as molding material, and vulcanizing it inside a mold, thereby to integrally form together with the steel core 20, and comprises a ground contact part 11, which contacts with the ground, and is protrudingly formed on the upper surface thereof, a link coupling part 12, which is dently formed on the lower center surface thereof and coupled with a track link connected with endless type, and an installation hole 13, which is formed between the ground contact parts 11.

Therefore, since the steel core 20 as stiffener is installed inside the pad body 10 as above, the rigidity of the rubber-made pad body 10 can be greatly increased, and the steel core 20 has installation holes 23 on its center to communicate with the installation holes 13 of the pad body 10.

The crawler pad P can be integrally installed to the track link by making the link coupling part 12 of the crawler pad P face to each other with the track link connected by endless type, and penetrating the installation holes 13 and 23 and the track link by using coupling members so as to be integrally coupled together.

Figure 7:
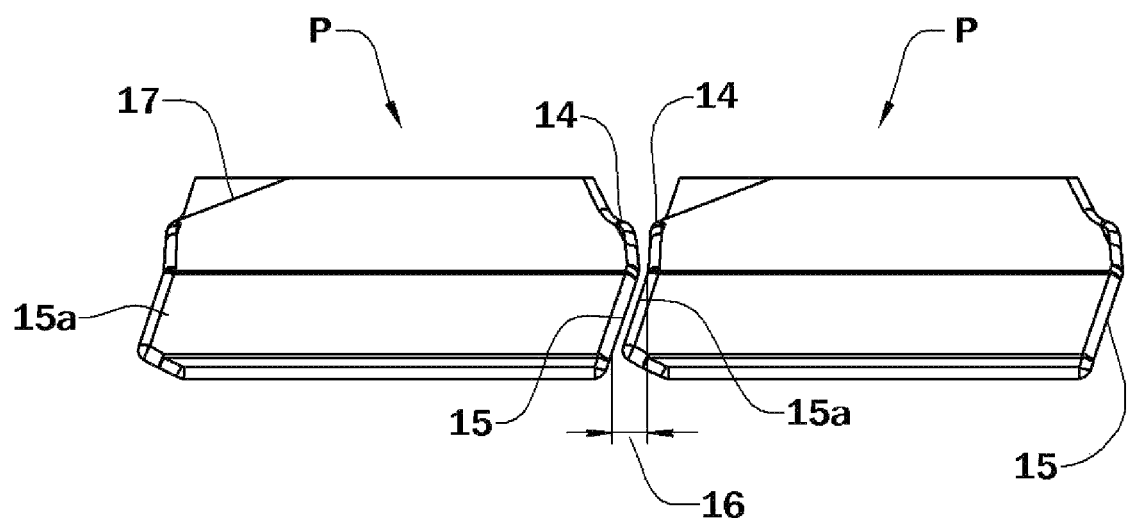
FIG. 7 is a side view showing that the crawler pads of the present invention are sequentially installed.
Figure 8:
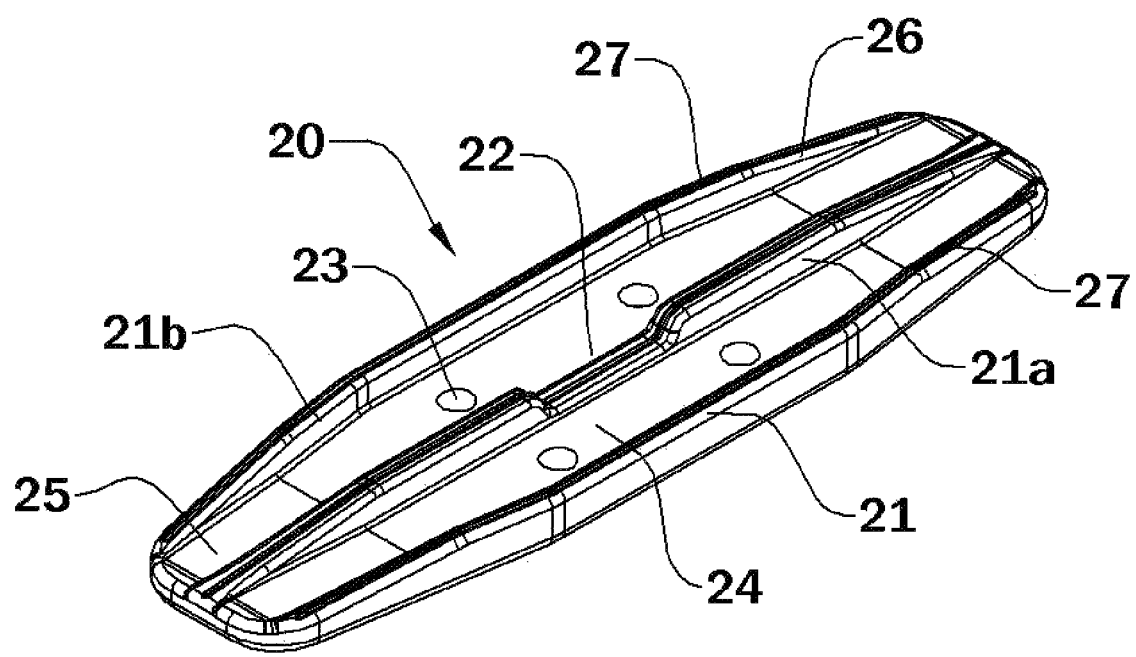
FIG. 8 is a perspective view showing a steel core of the crawler pad according to one embodiment of the present invention.
Figure 9:
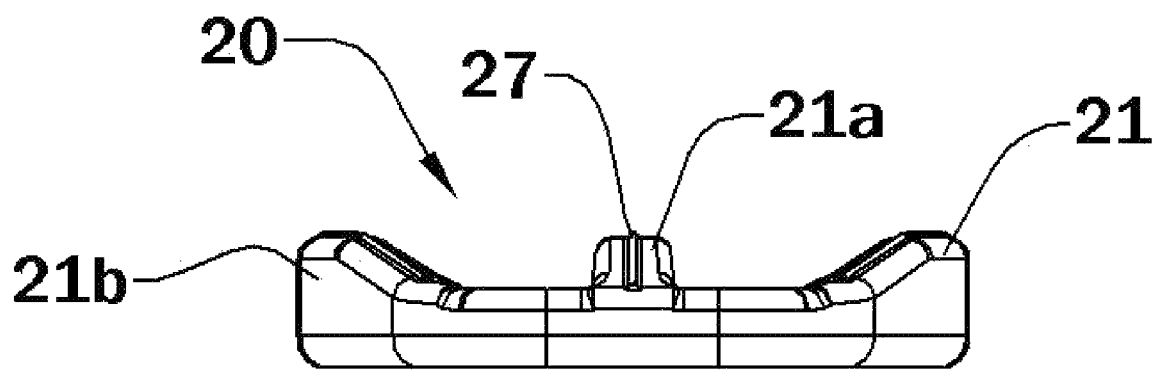
FIG. 9 is a side view showing a steel core of the crawler pad according to one embodiment of the present invention.
Figure 10:
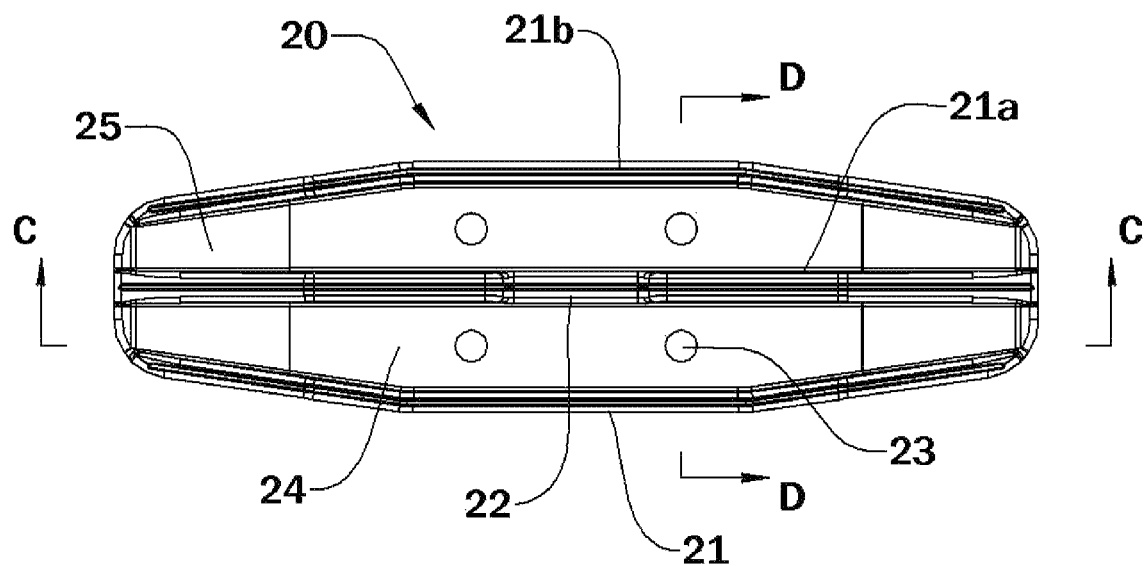
FIG. 10 is a plan view showing a steel core of the crawler pad according to one embodiment of the present invention.
Figure 11:
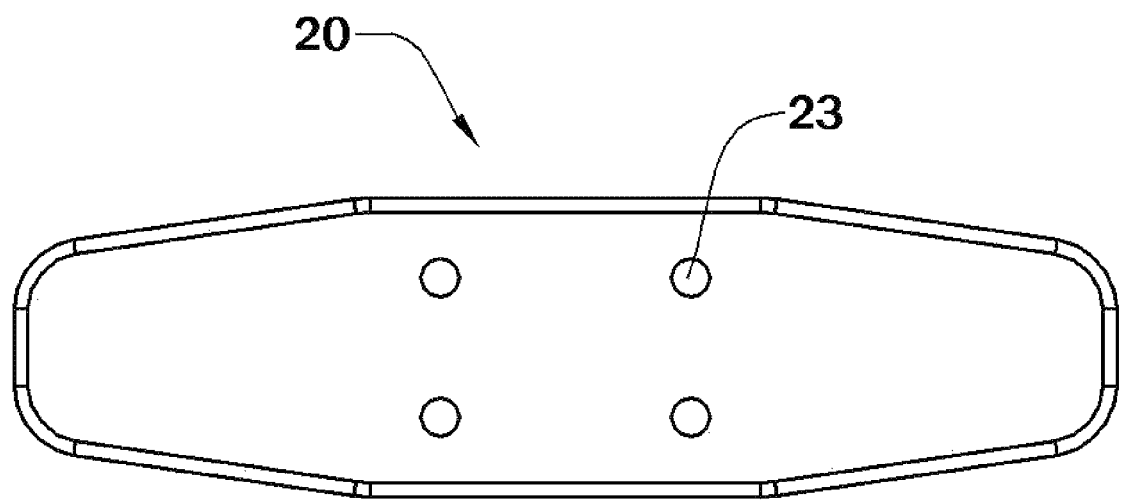
FIG. 11 is a bottom view showing a steel core of the crawler pad according to one embodiment of the present invention.
Figure 12:
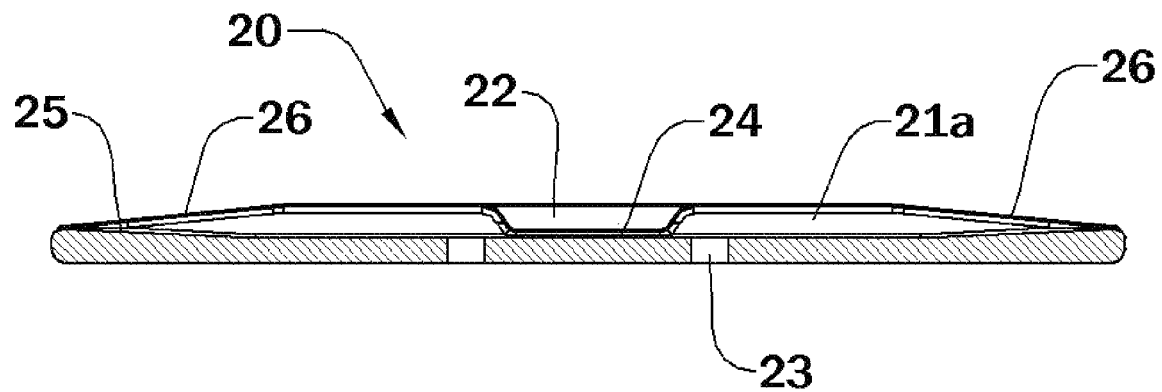
FIG. 12 is a sectional view of FIG. 10 cut by C-C according to one embodiment of the present invention.
Figure 13:
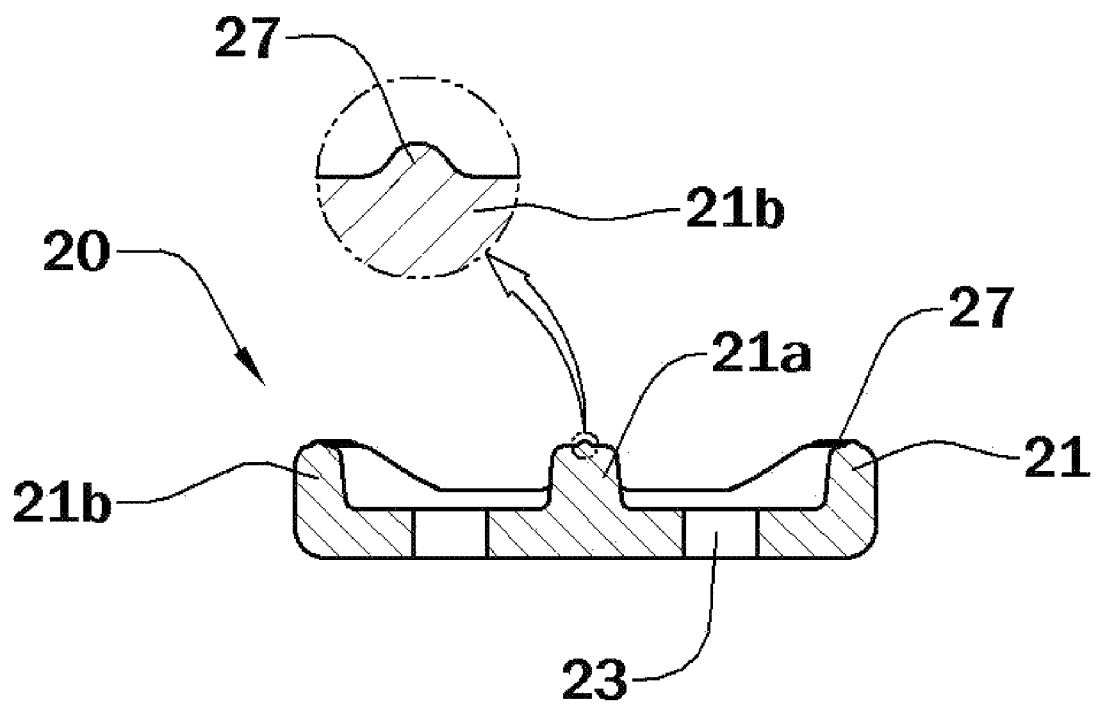
FIG. 13 is a sectional view of FIG. 10 cut by D-D according to one embodiment of the present invention.
Figure 14:
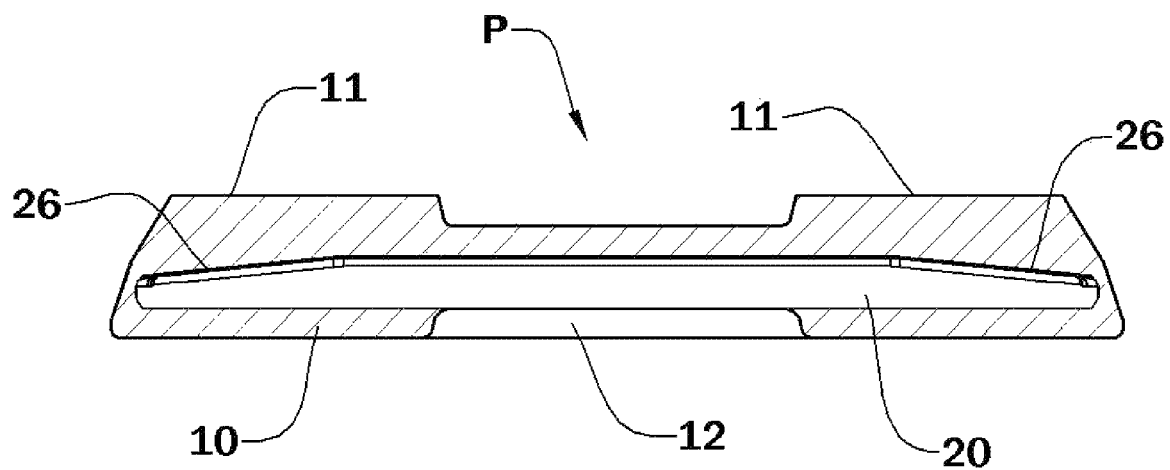
FIG. 14 is a right sectional view showing the contact state of a pad body and a steel core of the crawler pad according to one embodiment of the present invention.

The crawler pad P of the present invention which comprises the pad body 10 and the steel core 20 as such is installed in the track link connected by endless type, and a plurality of the crawler pads P are sequentially installed as shown in FIG. 7, and foreign materials are prevented from coming into the space between the crawler pads P.

In order to realize it, the pad body 10 includes a stop bump 14 for preventing foreign materials from entering, which is formed protrudingly on each of the front and back of the ground contact parts 11.

The stop bump 14 functions to firstly prevent foreign materials from coming into and between neighboring pad bodies 10.

Further, the present invention additionally provides the technology of forming overlap inclines 15 and 15a on the front and back sides of the pad body 10 respectively which are shaped with inclined downwards, while escaping from the typical shape of the prior arts where the front and back sides of the pad body 10 are formed vertically.

Therefore, the overlap inclines 15 and 15a of one pad body 10 are placed to face with another overlap inclines 15 and 15a of another neighboring pad body 10 while overlapped inclinedly with each other so as to form an overlap region 16. Thus, even though foreign materials pass through the stop bump 14 and move downwards, but they are secondly prevented from passing into the overlap region 16, so that foreign materials are completely prevented from coming into and between the pad bodies 10, and it is prevented the pad body 10 made of rubber from torn apart or broken so as to provide the advantage of greatly enhancing the life time of the crawler pad P.

The pad body 10 also includes a non-ground contact surface 17 which is formed to be inclined downwards at the back surface of the ground contact part 11, and functions to decrease the contact space with the ground. When the apparatus having the crawler pad P of the present invention installed in turns to one side, the rotation frictional resistance with the ground is decreased and the apparatus can be rotated easily and safely by reducing the contact space of the ground contact part 11 with the ground due to the non-ground contact surface 17 as above.

Further, the steel core 20 includes reinforcing bumps 21, 21a, and 21b on the front, middle and back of the upper surface of the steel core 20 respectively with upwardly protruded there from along its longitudinal direction in order to reinforce the rigidity of the pad body 10, instead of forming as typical plane shape.

The reinforcing bumps 21, 21a, and 21b prevent the plane-shaped steel core 20 from being deflected so as to greatly increase the strength of the steel core 20, and also function to improve the adhesive force by widening the mutual contact area that the rubber pad body 10 is contacted and bonded with the steel core 20 during manufacturing of the crawler pad P. Furthermore, the reinforcing bumps 21, 21a, and 21b provide the effective result of inducing flowed rubber during vulcanizing process to be flowed well through the spaces between the reinforcing bumps 21, 21a, and 21b along them so that the entire external surface of the steel core 20 can be contacted with the pad body 10 thoroughly.

Among the reinforcing bumps 21, 21a, and 21b, the reinforcing bump 21a located at the center further includes a rubber path 22 with dented in order to facilitate the flowed rubber and air during injection molding process of the pad body 10 to well flow through all spaces overall between the reinforcing bumps 21, 21a, and 21b in order to improve flow ability, which provides results of preventing the flowed rubber from collected locally and the effects of improving the integrity of the pad body 10 and the steel core 20, so as to eventually allow manufacturing of high-qualified crawler pads P.

Also, a warp prevention sill 27 is additionally formed on the upper end surface of each of the reinforcing bumps 21, 21a, and 21b with protruded there from, so as to further improve the strength of the steel core 20 as well as the strength improvement of the steel core 20 by the reinforcing bumps 21, 21a, and 21b.

In addition to the reinforcing bumps 21, 21a, and 21b, which are used to strengthen the longitudinal direction strength of the steel core 20, there is also provided, as ways of strengthening the breadth direction strength of the steel core 20 and the stiffness of the edge portion, the steel core 20 is formed such that a central part 24 with the installation holes 23 is formed with equal thickness, but edge reinforcing parts 25 are formed on both sides of the central part 24 and the thicknesses of the edge reinforcing parts 25 are gradually greater further going upwardly toward both end sides.

Further, additional component of rubber thickness enlargements 26 is added to each of the reinforcing bumps 21, 21a, and 21b, in which the center of the bump is formed as plane surface and the both sides are inclined downwards.

The portion of the pad body 10 contacted with the rubber thickness enlargement 26 provides special effects of maximizing buffering and increasing good ride even when the apparatus is inclined toward one side during rotation operation because the rubber thickness at the portion of the pad body 10 contacted with the rubber thickness enlargement 26 is enlarged compared with the bonded portions at the centers of the reinforcing bumps 21, 21a, and 21b, and thus the cushion ability at the portion can be further improved, thereby providing higher stability at the operation of the apparatus.

The foregoing is illustrative of embodiments and is not to be construed as limiting thereof. Although a few embodiments have been described, those skilled in the art will readily appreciate that many modifications are possible without materially departing from the novel teachings and advantages. Accordingly, all such modifications are intended to be included within the scope of this present invention as defined in the claims. In the claims, means-plus-function clauses are intended to cover the structures described herein as performing the recited function, and not only structural equivalents but also equivalent structures.

What is claimed is:

1. A crawler pad, comprising:

a pad body (10) having ground contact parts (11) on an upper surface of the pad body (10), a link coupling part (12) formed at a center of a bottom surface of the pad body (10), the link coupling part (12) including a recess in the bottom surface of the pad body (10), and a plurality of first installation holes (13) in the pad body (10) between the ground contact parts (11);

a steel core (20) located inside the pad body (10) and extending between the contact parts (11) of the pad body (10), the steel core (20) having second installation holes (23) aligned with the first installation holes (13) of the pad body (10);

a stop bump (14) protruding from each of a front surface and a back surface of the ground contact part (11), the stop bump (14) configured such that when two pad bodies (10) are arranged side-by-side so as to be arranged as neighboring pad bodies (10), the stop bump (14) is configured to prevent foreign materials from entering into a space between the neighboring pad bodies (10);

a first overlap incline (15) and a second overlap incline (15a) formed on a front lower surface and a back lower surface of the pad body (10), respectively, the first and second overlap inclines (15) and (15a) inclined downwards such that, when the two pad bodies (10) are arranged side-by-side as the neighboring pad bodies (10), the first overlap incline (15) of one of the neighboring pad bodies (10) overlaps, in a vertical direction, the second overlap incline (15a) of the other of the neighboring pad bodies (10) to thereby form an overlap region (16) configured to prevent foreign materials from entering a space between the neighboring pad bodies (10);

a non-ground contact surface (17) formed at an angle relative to the back surface of the ground contact part (11), in order to reduce a surface area of the pad body (10) in contact with the ground when the ground contact part (11) rests on the ground; and a first reinforcing bump (21), a second reinforcing bump (21a), and a third reinforcing bump (21b) longitudinally formed at a front, a middle, and a back, respectively, on an upper surface of the steel core (20), to protrude in an upward direction from the upper surface of the steel core (20), the second reinforcing bump (21a) arranged between the first reinforcing bump (21) and the third reinforcing bump (21b)

wherein the steel core (20) comprises:

a central part (24) in which the installation holes (23) are formed, the central part (24) having a uniform thickness, and edge reinforcing parts (25) located respectively on both sides of the central part (24), the upper surface of the edge reinforcing parts (25) sloping in the upward direction such that the edge reinforcing parts (25) increase in thickness in a direction from the central part (24) towards each end, respectively, of the steel core (20), a rubber path (22) formed at a center of the second reinforcing bump (21a), the rubber path (22) defining a recess in the second reinforcing bump (21a) and configured to allow rubber to flow through the rubber path (22) between the first, second, and third reinforcing bumps (21), (21a) and (21b) during a vulcanization process of the pad body (10), a warp prevention sill (27) protruding from an upper end surface of each of the first, second, and third reinforcing bumps (21), (21a), and (21b), and rubber-thickness enlargements (26) formed on both sides of each of the first, second, and third reinforcing bumps (21), (21a), and (21b), the rubber-thickness enlargements (26) having a tapered shape in a direction from a center of the pad body (10) toward the ends of the pad body (10) such that the rubber-thickness enlargements (26) have a greater thickness at the center of the second reinforcing bump (21a) and at a center of each of the first and third reinforcing bumps (21) and (21b) than at ends of the first, second, and third reinforcing bumps (21), (21a), and (21b).

* * * * *